(12) United States Patent
Chew

(10) Patent No.: US 8,005,267 B2
(45) Date of Patent: Aug. 23, 2011

(54) INTELLIGENT VEHICLE ACCESS CONTROL SYSTEM

(75) Inventor: Khien Meow David Chew, Singapore (SG)

(73) Assignee: Stratech Systems Limited, Singapore (SG)

(*) Notice: Subject to any disclaimer, the term of this patent is extended or adjusted under 35 U.S.C. 154(b) by 0 days.

(21) Appl. No.: 12/252,717

(22) Filed: Oct. 16, 2008

(65) Prior Publication Data

US 2009/0251541 A1    Oct. 8, 2009

Related U.S. Application Data

(63) Continuation of application No. 10/736,888, filed on Dec. 16, 2003, now abandoned.

(30) Foreign Application Priority Data

Jan. 7, 2003   (AU) ................................ 2003900048

(51) Int. Cl.
  G06K 9/00    (2006.01)
  G06K 9/32    (2006.01)
  G08B 21/00   (2006.01)
  H04N 7/18    (2006.01)
(52) U.S. Cl. ........ 382/104; 382/105; 382/294; 340/540; 348/143; 348/148
(58) Field of Classification Search .......... 340/5.1–5.92, 340/541; 382/104, 105, 115–117, 148; 348/148, 348/156
See application file for complete search history.

(56) References Cited

U.S. PATENT DOCUMENTS

| | | | |
|---|---|---|---|
| 5,091,924 A | 2/1992 | Bermbach et al. | 378/57 |
| 5,449,864 A | 9/1995 | Beatty et al. | 177/25 |
| 6,549,118 B1* | 4/2003 | Seal et al. | 340/5.82 |
| 6,559,769 B2* | 5/2003 | Anthony et al. | 340/574 |
| 6,856,344 B2* | 2/2005 | Franz | 348/143 |
| 6,958,676 B1* | 10/2005 | Morgan et al. | 340/5.72 |
| 6,970,576 B1* | 11/2005 | Tilsley | 382/103 |
| 7,016,518 B2* | 3/2006 | Vernon | 382/105 |

(Continued)

FOREIGN PATENT DOCUMENTS

EP    0485192 A2    11/1991

(Continued)

OTHER PUBLICATIONS

Dickson et al, "Mosaic generation for under vehicle inspection", Applications of Computer Vision, 2002. (WACV 2002). Proceedings. Sixth IEEE Workshop on Publication Date: 2002 On pp. 251-256.*

Yeoman, "Under Vehicle Examination andl novel applications of Digital Storage Techniques", Security Technology, 1995. Proceedings. Institute of Electrical and Electronics Engineers 29th Annual 1995 International Carnahan Conference on Publication Date: Oct. 18-20, 1995 On pp. 119-128.*

(Continued)

*Primary Examiner* — Vu Le
*Assistant Examiner* — Andrae S Allison
(74) *Attorney, Agent, or Firm* — Harness, Dickey & Pierce, P.L.C.

(57)   ABSTRACT

An apparatus for the automatic inspection of a motor vehicle has an identification and psychological profiling zone, an automatic inspection zone and a manual inspection zone. A biometric and heart rate detection station and an attached console are located in zone one. Undercarriage scanning equipment and an explosives detection portal are located in zone two. The apparatus also has one or more fixed cameras, an alarm or other alerting mechanisms and a physical barrier. A vehicle detection mechanism detects the entry of a vehicle into zone two and captures an image of the vehicle number plate. When the captured biometric data and number plate data indicate that the driver is authorized to drive the particular vehicle into the secured zone, and if no abnormalities or foreign objects in the undercarriage image are detected, the driver is allowed to proceed.

42 Claims, 4 Drawing Sheets

U.S. PATENT DOCUMENTS

| | | | |
|---|---|---|---|
| 7,079,007 B2 * | 7/2006 | Siegel et al. | 340/5.52 |
| 7,102,665 B1 * | 9/2006 | Chandler et al. | 348/148 |
| 7,183,895 B2 * | 2/2007 | Bazakos et al. | 340/5.7 |

FOREIGN PATENT DOCUMENTS

| | | | |
|---|---|---|---|
| EP | 1160734 A2 | 5/2001 | |
| GB | 2337839 A | 1/1999 | |

OTHER PUBLICATIONS

Supplementary European Search Report for EP 03777504 dated Oct. 15, 2009 (4 pages).

Office Action for EP 03777504 dated Dec. 21, 2009 (4 pages).

Official Action issued by the European Patent Office in a counterpart foreign application dated Jul. 13, 2010.

* cited by examiner

US 8,005,267 B2

INTELLIGENT VEHICLE ACCESS CONTROL SYSTEM

CROSS-REFERENCE TO RELATED APPLICATIONS

This application is a continuation of U.S. patent application Ser. No. 10/736,888 filed on Dec. 16, 2003 which claims the benefit and priority of Australian Provisional Application No. 2003900048 filed on Jan. 7, 2003. The entire disclosure of the above application is incorporated herein by reference.

FIELD OF THE INVENTION

The present invention relates to monitoring and/or controlling vehicular access to sites, and in particular providing vehicular undercarriage scanning and/or driver recognition prior to a vehicle entering such sites.

BACKGROUND OF THE INVENTION

It is necessary to control access of personnel and vehicles to all sites, both civilian and military.

In recent decades, motor vehicles have been used in the type of terrorist activities that have come to be known as car bombings. Motor vehicles have carried explosives and detonated in a particular location to cause damage to personnel and property.

It is also the case that a motor vehicle that can legitimately be brought onto a site can be stolen or hijacked by a terrorist group, loaded with explosives and brought onto a site by a terrorist or brought in unawares by driver/passengers.

SUMMARY OF THE INVENTION

According to one aspect of the invention, there is provided apparatus for the automatic inspection of vehicles being driven into a first area. The apparatus comprises: imaging means, database means and means for comparing. The imaging means is for capturing an image of the undercarriage of a vehicle as it is being driven into the first area. The database means is for storing images of the undercarriages of vehicles which are permitted into the first area. The means for comparing is for comparing the captured image of the undercarriage of the vehicle being driven into the first area with one or more of the stored images of the undercarriages of vehicles on the database means.

In this aspect, the present invention allows for the scanning of the undercarriage of a vehicle for explosives or other illicit material, verification of both the identity of the driver and the identity of the vehicle, to establish that the particular vehicle is permitted into a sensitive site and that it is currently being driven by a driver who is permitted to drive it into that site.

According to another aspect of the invention, there is provided apparatus for the automatic inspection of vehicles being driven into a first area. The apparatus comprises: database means, means for capturing, number plate recognition means and means for interrogating. The database means contains: driver identification data identifying drivers who are permitted to drive vehicles into the first area; number plate data identifying vehicles which are permitted into the first area; and data identifying which driver is permitted to bring which vehicle into the first area. The means for capturing is for capturing identification data about a driver who is driving the vehicle into the first area. The number plate recognition means is for capturing number plate data about the vehicle being driven into the first area. The means for interrogating is for interrogating the database means on the basis of the captured identification data about the driver who is driving the vehicle into the first area and on the basis of the captured number plate data to determine whether or not that driver is permitted to drive that vehicle into the first area.

Either of the above aspects may allow for the scanning of the undercarriage of a vehicle for explosives or other illicit material, verification of both the identity of the driver and the identity of the vehicle, to establish that the particular vehicle is permitted into a sensitive site and that it is currently being driven by a driver who is permitted to drive it into that site.

According to a further aspect of the invention, there is provided a method for the automatic inspection of vehicles being driven into a first area. The method comprises the steps of: capturing an image and comparing the captured image. The captured image is an image of the undercarriage of a vehicle as it is being driven into the first area. The captured image of the undercarriage of the vehicle being driven into the first area is compared with one or more stored images of the undercarriages of vehicles which are permitted into the first area.

According to again another aspect of the invention, there is provided a method for the automatic inspection of vehicles being driven into a first area. The method comprises: capturing data, reading a number and determining whether a driver is permitted to drive a vehicle into the first area. The captured data is identification data about a driver who is driving the vehicle into the first area. The number is the number on the vehicle number plate of the vehicle being driven into the first area. Determining whether the driver is permitted to drive that vehicle into the first area is based on captured identification data about the driver who is driving the vehicle into the first area, on captured number plate data, and on driver identification data identifying drivers who are permitted to drive vehicles into the first area.

According to a yet further aspect of the invention, there is provided a method of controlling vehicular access to a secure site having at least one entrance with a plurality of inspection zones, each inspection zone being contiguous with at least one other inspection zone and at least one inspection zone being contiguous with the secure site. The method includes the steps of: permitting a driver to bring a vehicle into a first one of the inspection zones, conducting at least one inspection process on the vehicle in the first inspection zone and possibly permitting the driver to bring the vehicle into a second one of the inspection zones and conducting at least one inspection process on the vehicle in the second inspection zone. The vehicle which the driver is permitted to bring a vehicle into the first inspection zone is a vehicle attempting access to the first area. The allowable outcomes of the at least one inspection process in the first inspection zone comprise: (i) the vehicle failing the or at least one inspection process and: (a) the vehicle not being permitted to move out of the first inspection zone; or (b) the vehicle being allowed to leave without proceeding into the first area; and (ii) the vehicle passing the or all the inspection processes and being permitted to move out of the first inspection zone into the second inspection zone. If the vehicle has entered the second inspection zone the at least one inspection process on the vehicle in the second inspection zone is conducted. The allowable outcomes of the at least one inspection process in the second inspection zone comprise: (iii) the vehicle failing the or at least one inspection process and: (c) the vehicle not being permitted to move out of the second inspection zone; or (d) the vehicle being allowed to leave without proceeding into the first area; and (iv) the vehicle passing the or all the inspection processes and being permitted to move out of the second inspection zone.

BRIEF DESCRIPTION OF THE DRAWINGS

The invention is further described by way of non-limitative example with reference to the accompanying drawings, in which.

DESCRIPTION OF PREFERRED EMBODIMENT

The Apparatus of the Invention

Figure 1:
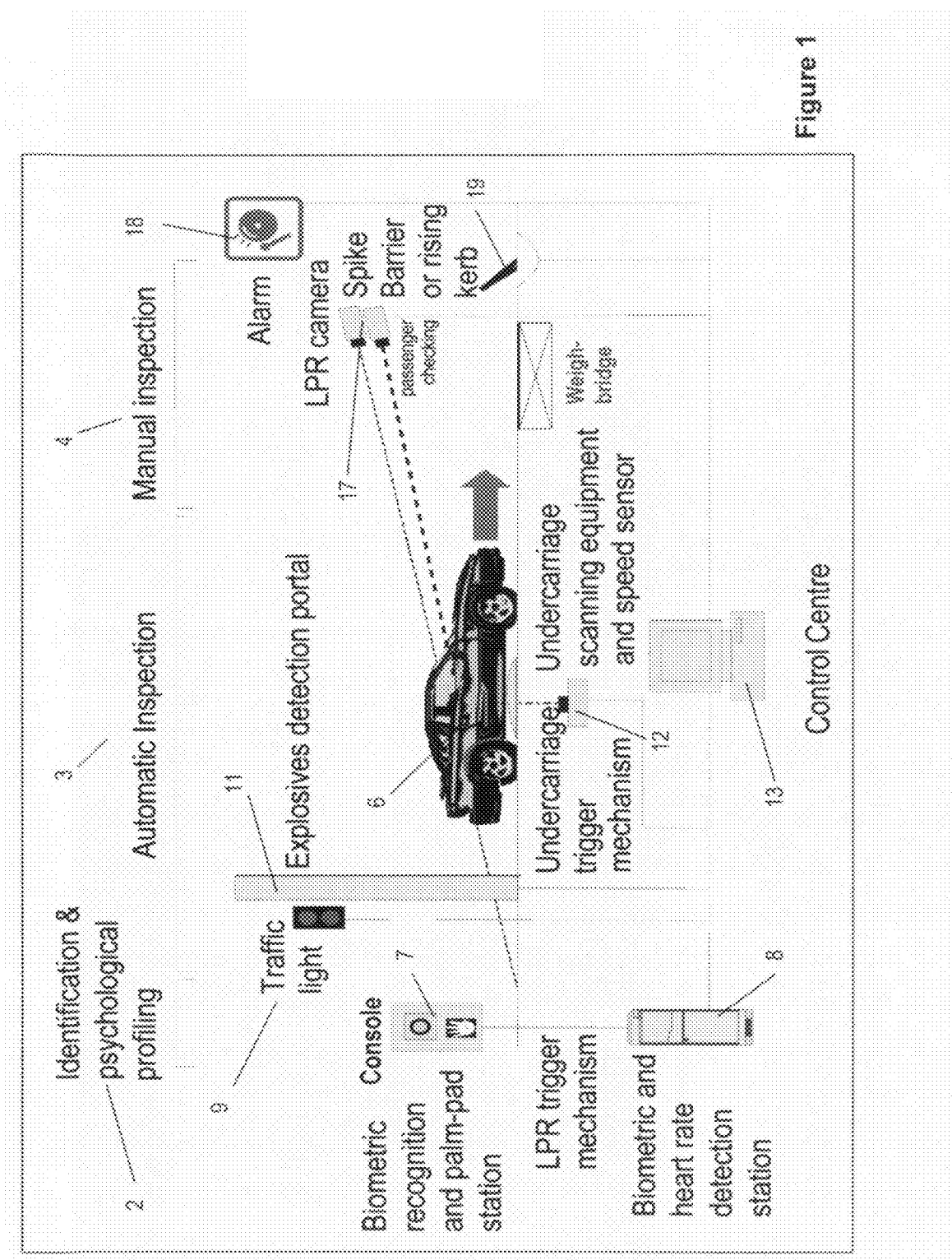
FIG. 1 shows an overview of an apparatus according to one embodiment of the invention.

A preferred embodiment of the present invention is illustrated generally at item 1 in FIG. 1.

The arrangement of apparatus according to the embodiment of FIG. 1 is in three zones, an identification and psychological profiling zone 2, an automatic inspection zone 3 and a manual inspection zone 4.

The apparatus of the present invention includes a control center 13. Control and/or signal paths connect components of the system to the control center 13. Those components include biometric and heart rate detection station 8 with an attached console 7, a traffic light 9, an explosives detection portal 11, undercarriage scanning apparatus 12, one or more fixed cameras 17, an alarm 18 and a physical barrier 19. The apparatus of the present invention can be placed in multiple locations with each installation networked so as to be controlled by a centralized management system. The benefits of a centralized control include more efficient administration, timely maintenance and a reduction in security personnel required to support the multiple installations. Further for facilities having multiple entry and exit points further data can be recorded as to the time of visit and time of exit including duration of the visit. Placing centralized control yields a holistic approach to security with incidents at the installations being managed and controlled along with other security measures and so avoiding the potential for errors or redundancy.

According to alternative preferred embodiments of the invention which are not shown in the drawings, spike or other suitable barriers are also located at either or both of the transition regions between:

the identification and psychological zone and the automatic inspection zone; and the automatic inspection zone and the manual inspection zone.

Figure 3:
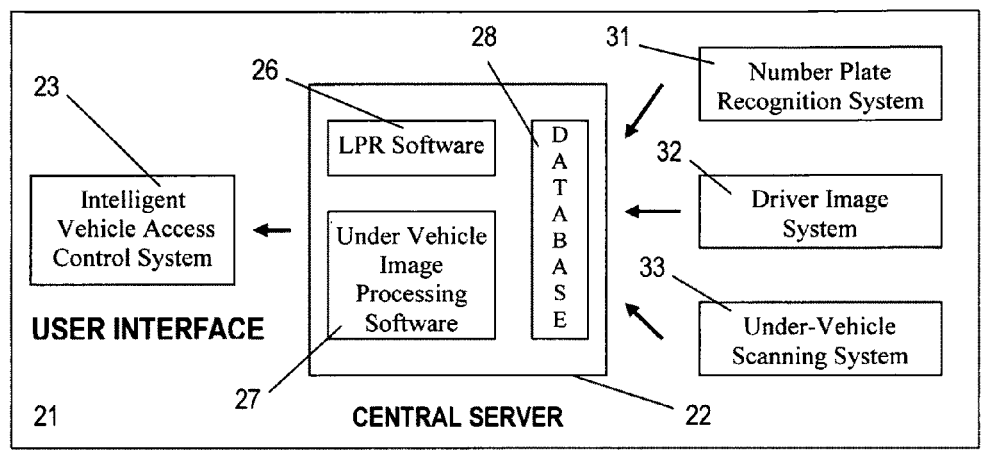
FIG. 3 shows the logical architecture of the embodiment of FIG. 1.

The logical architecture 21 of the system of FIG. 1 is illustrated in FIG. 3. The central server 22 is running number plate recognition (licence plate recognition—LPR) software 26, undercarriage image processing software 27 and database software 28. The central server 22 presents a user interface 23 to a user. A number plate recognition system 31, driver image system 32 and undercarriage scanning system 33 also have inputs to the central server 22.

Figure 4:
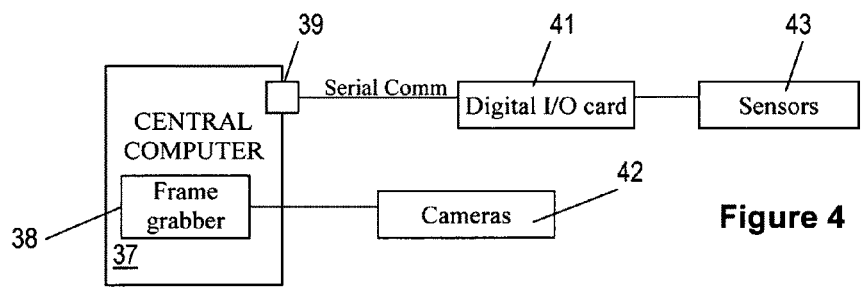
FIGS. 4 and 5 are block diagrams of sub-systems of FIG. 3.

FIG. 4 is a representation of the architecture of the number plate recognition system, the software 26 of which runs on the central server 22. The LPR software 26 is used to recognise the number on the vehicle number plate (which, according to the country, may be the registration or licence plate, etc.). This system includes a central computer 37 (which may or may not be the same computer as the central server 22 of FIG. 3). The central computer 37 interfaces by way of suitable hardware such as frame grabber 38, communications port 39 and digital I/O card 41 with cameras and sensors 42 and 43. It will be appreciated that, although these cameras and sensors are numbered as items 42 and 43 in FIG. 4, their physical implementations include the LPR camera 17 of FIG. 1.

Figure 5:
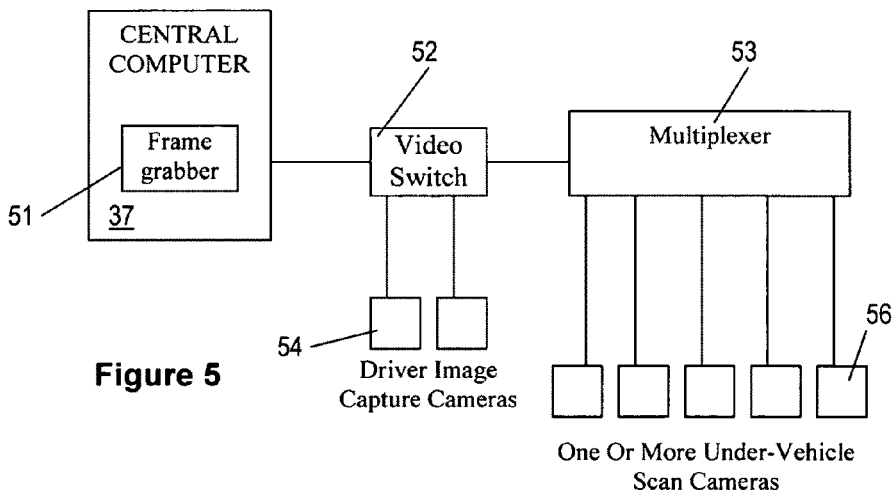

FIG. 5 is a representation of the architecture of the undercarriage scanning and driver verification systems. The central computer 37 interfaces by way of a frame grabber 51, video switch 52 and multiplexer 53 with driver verification cameras 54 and undercarriage scanning camera 56. It will be appreciated that, although the driver verification cameras and undercarriage scan camera are numbered as items 54 and 56 in FIG. 5, their physical implementations include cameras 14 and 17 of FIG. 1 and the undercarriage scanning equipment illustrated as item 12 in FIG. 1.

Figure 6:
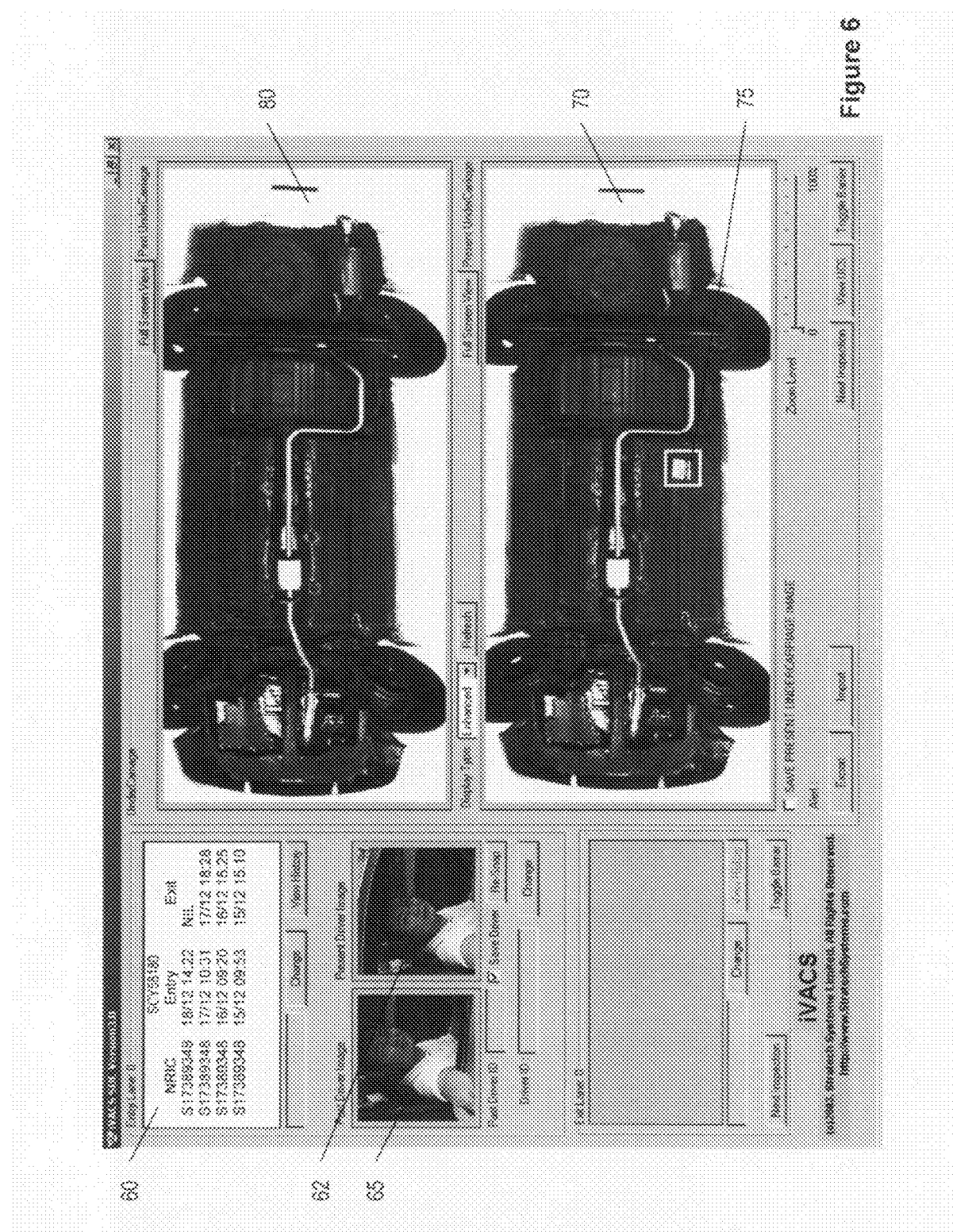
FIG. 6 is an example of the user interface of the embodiment of FIG. 1.

FIG. 6 is a representation of an exemplary computer display on a screen as monitored by security personnel. The screen includes a current undercarriage image 70, the vehicle number plate number and a current image of the driver 62, as well as a past, reference undercarriage image 80 and a past, reference driver image 65. Identification of the vehicle, as it is driven into the inspection system, is initiated through cameras providing the vehicle number plate number which appears in the vehicle data image 60, which also includes the NRIC number of the driver and previous entry and exit times and dates. The current driver image 62 is compared with the stored driver image 65 for inspection by the operator. At the same time the actual undercarriage image 70 "stitched" together to show a composite view on screen is then compared to the stored images 80 of the vehicle undercarriage. Where abnormalities 75 are identified, these may be further enhanced for closer detailed inspection by the operator.

Operation of the Apparatus of the Invention

Figure 2:
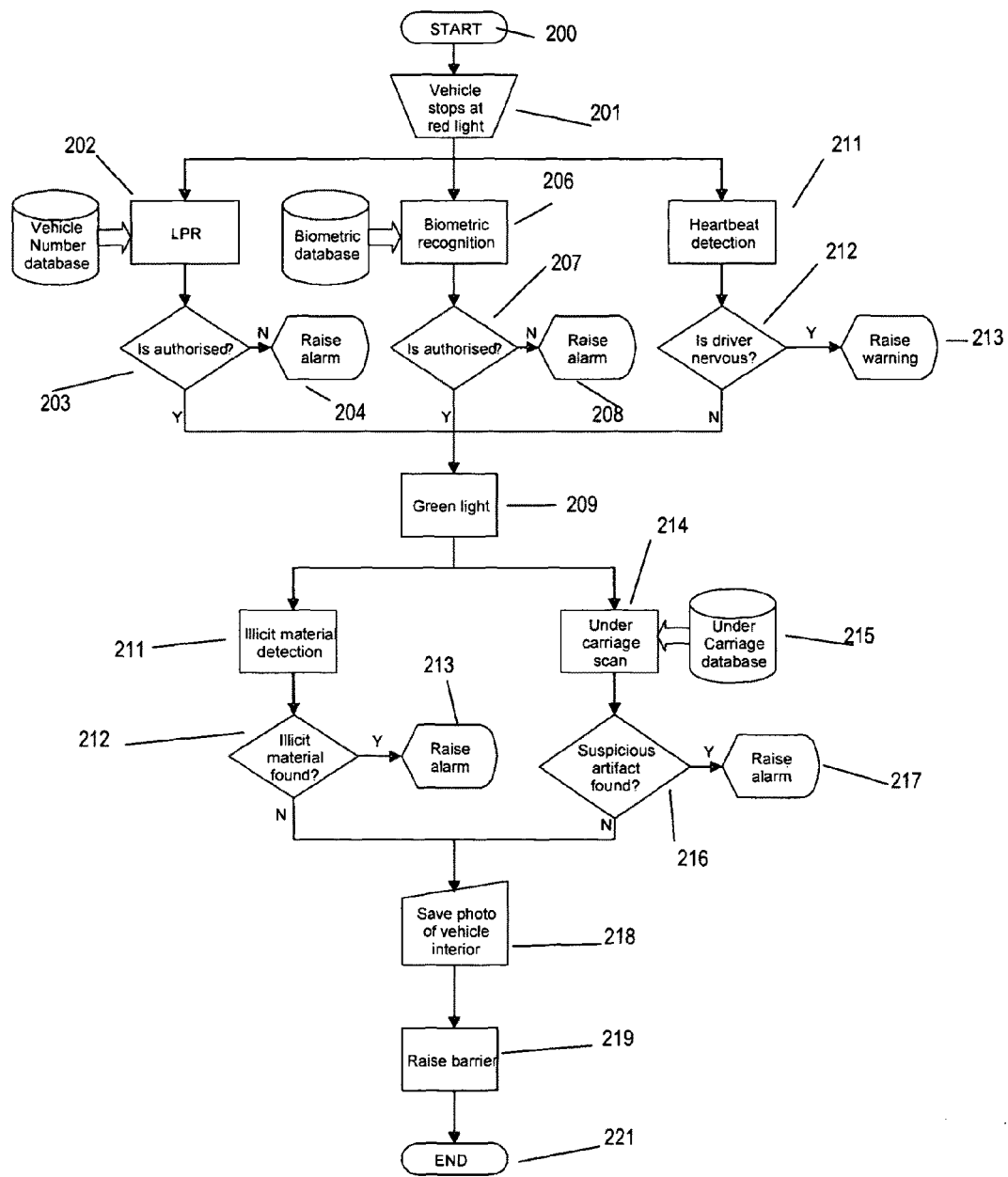
FIG. 2 is a flowchart illustrating the operation of the apparatus of FIG. 1.

The following description of the operation of the apparatus of the invention should be read in conjunction with the top-level flow-chart of FIG. 2, which gives an overall view of that operation.

As a vehicle such as that illustrated at 6 in FIG. 1 is driven into the inspection system 1, the driver of the vehicle is presented with a red light by traffic light 9 (action 201 of FIG. 2).

When the vehicle 6 enters the identification and psychological profiling zone 2, it is detected by the camera 17, or other detection means. This detection of the vehicle triggers the number plate recognition system. The number plate recognition functions are then assigned to the camera 17.

The detection of the vehicle 6 triggers the number plate recognition system and at the same time the driver is prompted to wind down the window, look into the facial identification camera adjacent to the vehicle, and place his or her hand on a sensor in the biometric recognition and heart rate detection console 7. The placement of the driver's hand on this sensor also acts as a trigger to activate the facial identification or eye scanning system.

In a preferred embodiment, the driver may also be prompted to speak so as measure a voice characteristic. According to further preferred embodiments of the invention, the heart rate data that is captured is compared with base-line pulse rate data about the driver to infer whether or not the driver is exhibiting any nervousness. Similarly the voice characteristic is compared to existing voice data about the driver to determine the identity of the driver, or to infer whether or not the driver is nervous.

The following decisions are then made.

Based on the output of the number plate recognition system, a decision is made as to whether or not the vehicle is authorised to enter the secured zone (decision 203 of FIG. 2). If the vehicle is not authorised to enter the secured zone, an alarm is raised (204 of FIG. 2) or other alerting mechanism.

Based on the output of the biometric recognition system, a decision is made whether or not the driver is a person who is authorised to enter the secured zone (decision 207 of FIG. 2). If the driver is not authorised to enter the secure zone, an alarm is raised (208 of FIG. 2) or other alerting mechanism.

Based on the output of a heartbeat detector, a decision is made whether or not the driver is exhibiting nervousness at entering the secured zone (decision 212 of FIG. 2). If the driver is exhibiting such nervousness, an alarm is raised (213 of FIG. 2) or other alerting mechanism.

If none of these alarms is raised, the driver is presented with a green light (process 209 of FIG. 2) and drives the vehicle 6 through the explosives detection portal 11, and over the undercarriage scanning equipment.

If any illicit material is detected on passage of the vehicle 6 through the explosives detection portal 11, an alarm is raised (213 of FIG. 2) or other alerting mechanism.

The undercarriage scanning equipment is located within a housing, either above ground or below ground level, over which the vehicle will travel. The undercarriage image is created from a composite of images captured by the area scan camera whilst the vehicle is traversing the scanning equipment with the overlapping images "stitched" together to form the complete undercarriage image. The image that is captured of the vehicle undercarriage is compared with previous undercarriage images from a database (215 of FIG. 2) and if there is a discrepancy or detected foreign objects between the images an alarm is raised (217 of FIG. 2) or other alerting mechanism. These foreign objects may then be highlighted and traced in high resolution on the screen enabling the operator to zoom in for a more detailed inspection.

In each case the alarm or other alerting mechanism extends to audible and visual alarm means, while also activates engagable physical barriers such as retractable bollards, raised kerbs or spikes each capable of preventing the vehicle from proceeding or retreating. Further the installation may include physical protection means so that in the case of an explosion, the extent of the damage is limited, protecting life and property. The protection means may further minimise damage to the security apparatus from the explosion.

The apparatus of the invention is further applicable to both fixed installations and portable installations so as to establish an installation at a temporary site for a given event.

If neither of these alarms is raised, an image of the vehicle interior is saved (218 in FIG. 2) the barrier 19 is opened and the vehicle is free to proceed into the secured facility.

Various amendments and alternatives falling within the scope of the invention are readily apparent to the skilled artisan.

The entire disclosure of Australian provisional application No. 2003-900048 filed Jan. 7, 2003 is incorporated by reference.

The invention claimed is:

1. An apparatus for automatically inspecting a vehicle being driven into a first area, the apparatus comprising:
   database means containing:
   driver identification data identifying drivers who are permitted to drive vehicles into the first area;
   number plate data identifying vehicles which are permitted into the first area; and data identifying which driver is permitted to bring which vehicle into the secure site;
   means for capturing identification data about a driver who is driving the vehicle into the first area;
   number plate recognition means for capturing number plate data about the vehicle being driven into the first area; and
   means for interrogating the database means based on the captured identification data about the driver who is driving the vehicle into the first area and based on the captured number plate data to determine whether the driver is permitted to drive the vehicle into the first area;
   wherein the means for capturing identification data comprises:
   means for detecting physiological data about the driver who is driving the vehicle;
   means for inferring, from the detected physiological data, information about a current psychological profile of the driver; and
   means for triggering an alerting mechanism when the inferred current psychological profile of the driver matches specified criteria, wherein the specified criteria include a stress level of the driver, and wherein detecting the stress level of the driver of the vehicle takes place outside the vehicle.

2. The apparatus according to claim 1, wherein the means for inputting driver identification data comprises means for capturing identification data about the driver.

3. The apparatus according to claim 1, wherein the driver identification data for a driver comprises information from a personal identification card.

4. The apparatus according to claim 1, wherein the means for capturing identification data about a driver is operable to capture data from a driver's personal identification card.

5. The apparatus according to claim 1, wherein the driver identification data for a driver comprises biometrics data of the driver.

6. The apparatus according to claim 5, wherein the biometrics data identifying drivers who are permitted to drive vehicles into the first area comprises at least one of:
   a facial image of each such driver;
   a print at least a portion of a hand of each such driver;
   an eye scan of each such driver; and
   voice data of each such driver.

7. The apparatus according to claim 5, wherein the means for capturing identification data about a driver is operable to capture driver biometrics data.

8. The apparatus as claimed in claim 1, in which the physiological data include data about at least one of a pulse rate and voice characteristic data of the driver.

9. The apparatus as claim 8, in which:
   the apparatus further includes means for storing at least one of base-line pulse rate data and voice characteristic data about the driver; and
   the means for inferring the current psychological profile of the driver from the detected physiological data includes means for comparing at least one of the detected pulse rate of the driver with the base-line pulse rate data for the driver, and the detected voice characteristic of the driver with the stored voice characteristic data for the driver.

10. The apparatus as claimed in claim 2, in which the apparatus is arranged in three zones, comprising:
   an identification and psychological profiling zone, in which the means for capturing identification data about the driver is located;

an automatic inspection zone, in which the imaging for capturing an image of the undercarriage of the vehicle is located; and a manual inspection zone.

11. The apparatus as claimed in claim 10, further comprising means, under control of the apparatus, for selectively preventing and allowing movement of the vehicle from the identification and psychological profiling zone into the automatic inspection zone.

12. The apparatus as claimed in claim 10, further comprising means, under control of the apparatus, for selectively preventing and allowing movement of the vehicle from the automatic inspection zone into the manual inspection zone.

13. The apparatus as claimed in claim 10, further comprising means, under control of the apparatus, for selectively preventing and allowing movement of the vehicle from the manual inspection zone into the first area.

14. The apparatus as claimed in claimed in claim 10 in which components of the apparatus that are located in at least one of:

the identification and psychological profiling zone:

the automatic inspection zone; and the manual inspection zone, are hardened against the effects of explosive blast.

15. The apparatus as claimed in claim 10, further comprising a number plate recognition camera for capturing number plate data about the vehicle being driven into the first area; and wherein the vehicle is visible to the number plate recognition camera on entry of the vehicle into the identification and psychological profiling zone; and on detection by the number plate recognition camera of the vehicle entering into the identification and psychological profiling zone, the number plate recognition camera is triggered to capture number plate data about the vehicle.

16. The apparatus according to claim 10 further comprising means for detecting a presence of explosives associated with the vehicle that is being driven into the first area located in at least one of the automatic inspection zone and manual inspection zone.

17. The apparatus as claimed in claim 16, wherein the means for detecting the presence of explosives include at least one of portable explosives detection devices and a detecting portal through which the vehicle is driven.

18. The apparatus as claimed in claim 1, wherein the number plate recognition means includes a number plate recognition camera.

19. The apparatus as claimed in claim 1, further comprising means for detecting a presence of explosives associated with the vehicle that is being driven into the first area.

20. The apparatus according to claim 19, wherein the means for detecting the presence of explosives comprises an area-scan camera for capturing a series of images of different areas of the undercarriage of the vehicle; and means for stitching the series of images of different areas of the undercarriage, to form a composite undercarriage image.

21. The apparatus according to claim 20, wherein individual images of the series of images are overlapping images.

22. The apparatus according to claim 20, wherein the composite undercarriage image is a complete undercarriage image.

23. The apparatus according to claim 1, wherein the vehicle is a motor vehicle.

24. The apparatus according to claim 1, wherein the first area is a secure site.

25. The apparatus according to claim 1, wherein a database means further stores vehicle identification data of vehicles permitted into the first area in association with the images of the undercarriages of those vehicles.

26. The apparatus according to claim 25, further comprising:

means for inputting an identification of a vehicle being driven into the first area; and wherein a means for comparing is operable to compare the captured image of the undercarriage of the vehicle with at least one of the stored images associated with the identification of the vehicle being driven into the first area and to highlight discrepancies therebetween.

27. The apparatus according to claim 26, further comprising means for triggering an alerting mechanism when the means for comparing highlights discrepancies.

28. The apparatus according to claim 26, wherein the means for inputting an identification of a vehicle comprises means for reading an identification number on the vehicle.

29. The apparatus according to claim 28, wherein the means for reading comprises number plate recognition means for reading a number on a vehicle number plate.

30. The apparatus according to claim 25, wherein the database means further contains driver identification data of drivers permitted to drive vehicles into the first area.

31. The apparatus according to claim 30, wherein the database means associates the driver identification data with at least one vehicle that individual drivers are permitted to drive into the first area.

32. The apparatus according to claim 31, further comprising:

means for inputting driver identification data of the driver of a vehicle being driven into the first area; and wherein the means for comparing is operable to compare input driver identification data with driver identification data contained in the database to determine whether the driver is permitted into the first area.

33. The apparatus according to claim 32, wherein the means for comparing is further operable to compare identification data of a current vehicle being driven into the first area with driver identification data contained in the database to determined whether the driver is permitted to drive the current vehicle into the first area.

34. A method for automatically inspecting a vehicle being driven into a first area, the method comprising:

capturing identification data about a driver who is driving the vehicle into the first area;

reading a number on a vehicle number plate of the vehicle being driven into the first area; and based on captured identification data about the driver who is driving the vehicle into the first area, captured number plate data, and driver identification data identifying drivers who are permitted to drive vehicles into the first area, determining whether the driver is permitted to drive the vehicle into the first area, wherein capturing identification data comprises:

detecting "by way of a processor remote from the vehicle" physiological data about the driver who is driving the vehicle;

inferring, from the detected physiological data, information about a current psychological profile of the driver; and triggering an alerting mechanism when the inferred current psychological profile of the driver matched specified criteria, wherein the specified criteria include a stress level of the driver.

35. The method according to claim 34, wherein capturing identification data about a driver comprises capturing data from a personal identification card.

36. The method according to claim 34, wherein capturing identification data about a driver comprises capturing biometrics data from the driver comprising at least one of:
 a facial image of each such driver;
 a print of at least a portion of a hand of each such driver;
 an eye scan of each such driver; and
 voice data of each such driver.

37. The method as claimed in claim 34, wherein: the physiological data includes data about either or both of the pulse rate and voice characteristic data of the driver; and
 wherein inferring the current psychological profile of the driver from the detected physiological data includes comparing at least one of the detected pulse rate of the driver with a stored base-line pulse rate data for the driver, and the detected voice characteristic of the driver with a stored voice characteristic data for the driver.

38. The method as claimed in claim 34, wherein:
 capturing identification data about the driver takes place when the vehicle is in an identification and psychological profiling zone;
 capturing an image of the undercarriage of the vehicle takes place when the vehicle is in an automatic inspection zone; and
 reading a number on a vehicle number plate when the vehicle is detected entering into the identification and psychological profiling zone; and
 detecting the vehicle entering into the identification and psychological profiling zone.

39. The method as claimed in claim 38, further comprising selectively preventing and allowing movement of the vehicle from at least one of:
 the identification and psychological profiling zone into the automatic inspection zone;
 the automatic inspection zone into a manual inspection zone; and
 the manual inspection zone into the first area.

40. The method as claimed in claim 34, further comprising detecting a presence of explosives associated with the vehicle that is being driven into the first area.

41. An apparatus for automatically inspecting a vehicle being driven into a first area, the apparatus comprising:
 database means containing:
  driver identification data identifying drivers who are permitted to drive vehicles into the first area;
  number plate data identifying vehicles which are permitted into the first area; and
  data identifying which driver is permitted to bring which vehicle into the secure site;
 means for capturing identification data about a driver who is driving the vehicle into the first area;
 number plate recognition means for capturing number plate data about the vehicle being driven into the first area; and
 means for interrogating the database means based on the captured identification data about the driver who is driving the vehicle into the first area and based on the captured number plate data to determine whether the driver is permitted to drive the vehicle into the first area;
 wherein the means for capturing identification data comprises:
  means for detecting physiological data about the driver who is driving the vehicle;
  means for inferring, from the detected physiological data, information about a current psychological profile of the driver; and
  means for triggering an alerting mechanism when the inferred current psychological profile of the driver matches specified criteria,
 wherein the specified criteria include a stress level of the driver, and
 wherein detecting the physiological data about the driver comprises determining if the identification presented by the driver is false or fake.

42. A method for automatically inspecting a vehicle being driven into a first area, the method comprising:
 capturing identification data about a driver who is driving the vehicle into the first area;
 reading a number on a vehicle number plate of the vehicle being driven into the first area; and
 based on captured identification data about the driver who is driving the vehicle into the first area, captured number plate data, and driver identification data identifying drivers who are permitted to drive vehicles into the first area, determining whether the driver is permitted to drive the vehicle into the first area,
 wherein capturing identification data comprises:
 detecting "by way of a processor" physiological data about the driver who is driving the vehicle;
 inferring, from the detected physiological data, information about a current psychological profile of the driver; and
 triggering an alerting mechanism when the inferred current psychological profile of the driver matches specified criteria,
 wherein the specified criteria include a stress level of the driver, and
 wherein detecting the physiological data about the driver comprises determining if the identification presented by the driver is false or fake.

* * * * *

UNITED STATES PATENT AND TRADEMARK OFFICE
CERTIFICATE OF CORRECTION

PATENT NO. : 8,005,267 B2  Page 1 of 1
APPLICATION NO. : 12/252717
DATED : August 23, 2011
INVENTOR(S) : Khien Meow David Chew It is certified that error appears in the above-identified patent and that said Letters Patent is hereby corrected as shown below:

Patent Front Page, Right Column, Other Publications, Line 4, "and1" should be --and--

Patent Column 7, Line 18 (Application Page 9, Line 12) second occurrence of "in claimed" should be removed Patent Column 7, Line 21 (Application Page 9, Line 14) ":" should be --;--

Patent Column 7, Line 40 (Application Page 10, Line 15) add "the" after --and-- to read "and the"

Signed and Sealed this
Eighth Day of November, 2011

David J. Kappos
*Director of the United States Patent and Trademark Office*